(12) United States Patent
Volponi

(10) Patent No.: US 7,441,448 B2
(45) Date of Patent: Oct. 28, 2008

(54) PROCESS FOR ADAPTING MEASUREMENT SUITE CONFIGURATION FOR GAS TURBINE PERFORMANCE DIAGNOSTICS

(75) Inventor: Allan J. Volponi, West Simsbury, CT (US)

(73) Assignee: United Technologies Corporation, Hartford, CT (US)

( * ) Notice: Subject to any disclaimer, the term of this patent is extended or adjusted under 35 U.S.C. 154(b) by 55 days.

(21) Appl. No.: 11/657,323

(22) Filed: Jan. 24, 2007

(65) Prior Publication Data

US 2008/0177505 A1 Jul. 24, 2008

(51) Int. Cl.
*G01M 15/00* (2006.01)
(52) U.S. Cl. .................................. 73/112.03
(58) Field of Classification Search ............ 73/112.01, 73/112.03, 112.04, 112.05, 118.01, 118.03
See application file for complete search history.

(56) References Cited

U.S. PATENT DOCUMENTS 4,215,412 A * 7/1980 Bernier et al. .............. 701/100
5,105,372 A 4/1992 Provost et al.
5,447,059 A 9/1995 Miller et al.
6,606,580 B1 8/2003 Zedda et al.
6,760,689 B2 7/2004 Follin et al.
6,804,612 B2 10/2004 Chow et al.
6,909,960 B2 6/2005 Volponi et al.
6,962,043 B2 11/2005 Venkateswaran et al.
7,031,878 B2 4/2006 Cuddihy et al.
7,136,809 B2 11/2006 Volponi
7,140,186 B2 11/2006 Venkateswaran et al.
7,216,071 B2 * 5/2007 Volponi ..................... 703/7
2004/0088100 A1 5/2004 Volponi
2004/0153815 A1 8/2004 Volponi
2008/0097662 A1 * 4/2008 Volponi ..................... 701/29
2008/0120074 A1 * 5/2008 Volponi ..................... 703/7

* cited by examiner

*Primary Examiner*—Eric S McCall
(74) *Attorney, Agent, or Firm*—Bachman & LaPointe, P.C.

(57) ABSTRACT

A method and system is described that estimates gas turbine engine module performance changes from gas path measurement data using a linear predictor-corrector estimation process. A measurement configuration matrix $M_C$ and a fault configuration $F_C$ matrix are assembled. The configuration matrices $M_C$ and $F_C$ are used to adapt a typical linear predictor-corrector type of performance estimation process to a given measurement suite and are ideally suited for linear estimation systems such as those using a Kalman filter.

24 Claims, 2 Drawing Sheets

PROCESS FOR ADAPTING MEASUREMENT SUITE CONFIGURATION FOR GAS TURBINE PERFORMANCE DIAGNOSTICS

BACKGROUND OF THE INVENTION

The invention relates generally to the field of gas turbine engine modeling. More specifically, the invention relates to methods and systems for adapting the measurement suite configuration of a gas turbine engine to provide robust performance tracking in light of sensor failures or data dropouts.

Gas turbine performance diagnostics concerns itself with tracking changes in engine module performance measures (typically efficiency and flow parameters) as the engine deteriorates over time. The primary sources of information driving this methodology are measurements taking along the engine's gas path, such as temperatures, pressures, speeds, etc. Tracking fleets of engines across a wide customer/aircraft base offers the added complexity that the measured parameters differ in instrumentation and recording fidelity and non-repeatability across installations.

Traditional performance diagnostic estimation methods employ some form of predictor/corrector estimation schemes. These procedures use the past performance estimation as a priori information for the current performance estimate calculation. Many of these approaches use linear estimation methods or derivatives of them to infer the performance changes from previous estimates and current data. The successful deployment of such diagnostic methods depends on many factors, one of which is its ability to adapt to different measurement suites without the need for employing complicated exception logic to cover all possible measurement scenarios.

A provision to provide some form of measurement configuration that will adapt itself to the measurement suite currently available and adapt to changes in this measurement set over the life of the engine monitoring program without requiring changes in the diagnostic software is a step to providing needed robustness in the performance tracking process. There are several factors that drive the need for such a measurement configuration process.

One factor is the fact that the number and types of gas path measurements available for conducting performance health trending, vary with the gas turbine model and type under consideration. For example, engines employing one or two spools, turbojet versus turbofan engines, mixed versus non-mixed flow, a new generation or a mature model engine, and others are factors that dictate what is and what is not available in the form of gas path instrumentation that provide the input parameter stream for the performance estimation process.

Many methods known in the art for performing engine module performance health tracking are generic in the sense that they may be applied to any type of gas turbine. Engine model specifics are the numeric model constants and the measurement suite available for the application. The former is typically a database issue whereas the latter may affect the actual software implementation of the process. A process that adapts to any specific measurement configuration would provide a greater degree of robustness and negate the need for software changes to implement a specific measurement set.

Another factor that drives the need for measurement configuration is that data dropouts are commonplace in aircraft engine monitoring. Parameters may, for whatever reason, disappear from the recorded input stream either intermittently for periods of time, or altogether. This may occur because of instrumentation problems, maintenance actions, recording anomalies, etc. Whatever the cause, the effective measurement suite changes as a result. If the performance estimation processing is dependent on a (pre-selected) measurement suite, the intermittent (or persistent) loss of one or more input parameters will cause a gap in the analysis to occur.

What is needed is a more robust engine performance tracking process that identifies the current time point measurement suite and adapts the measurement suite to changes to allow the performance estimation process to proceed.

SUMMARY OF THE INVENTION

Although there are various methods and systems that perform engine performance tracking, such methods and systems are not completely satisfactory. The inventor has discovered that it would be desirable to have methods and systems that adapt the measurement suite configuration of a gas turbine engine to provide robust performance tracking in light of sensor failures or data dropouts.

One aspect of the invention provides a method for adapting measurements from a gas turbine engine for use in performance tracking. Methods according to this aspect of the invention preferably start with selecting a default engine configuration for the gas turbine engine and its application, acquiring gas path data samples corresponding to a predetermined number of measured parameters, deriving performance parameters for the gas turbine engine, comparing the measured parameters and performance parameters at time k with predefined thresholds to determine the quality and/or availability of each parameter, wherein parameters determined to be questionable are defined as not present for performance tracking, determining a measurement configuration matrix $M_C$ based on the default engine configuration and present measured parameters Z, and a fault configuration matrix $F_C$ based on the default engine configuration and present performance parameters x, and adapting performance tracking methods using the measurement configuration matrix $M_C$ and fault configuration matrix $F_C$.

Another aspect of the method is where the measurement configuration matrix $M_C$ is an identity matrix of size m where m=number of measured parameters.

Another aspect of the method is where the fault configuration matrix $F_C$ is an identity matrix of size n where n=the number of performance faults being estimated.

Another aspect of the method is where a zero entry in the measurement configuration matrix $M_C$ main diagonal represents a questionable or missing parameter measurement.

Another aspect of the method is where a zero entry in the fault configuration matrix $F_C$ main diagonal represents those faults whose estimation is affected by the loss of a corresponding measurement parameter(s) that is used to calculate the performance estimate.

The details of one or more embodiments of the invention are set forth in the accompanying drawings and the description below. Other features, objects, and advantages of the invention will be apparent from the description and drawings, and from the claims.

DETAILED DESCRIPTION

Embodiments of the invention will be described with reference to the accompanying drawing figures wherein like numbers represent like elements throughout. Further, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting, and coupling. Further, "connected" and "coupled" are not restricted to physical or mechanical connections or couplings.

The invention is not limited to any particular software language described or implied in the figures. A variety of alternative software languages may be used for implementation of the invention. Some components and items are illustrated and described as if they were hardware elements, as is common practice within the art. However, various components in the method and system may be implemented in software or hardware.

The invention is a modular framework and may be deployed as software as an application program tangibly embodied on a program storage device. The application code for execution can reside on a plurality of different types of computer readable media known to those skilled in the art.

Figure 1:
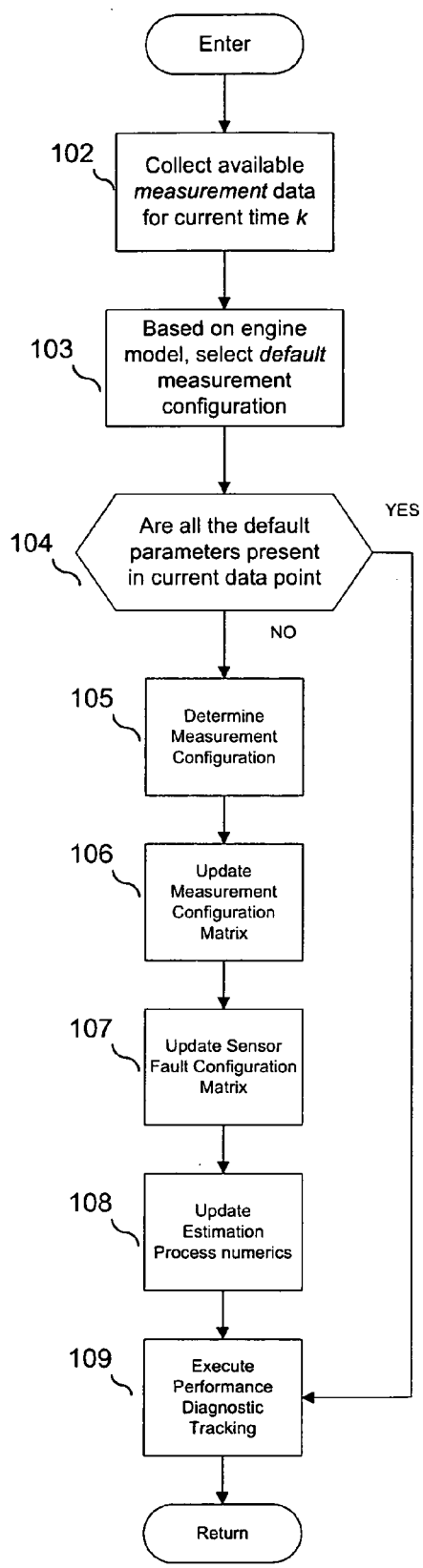
FIG. 1 is a block diagram of an exemplary method.

FIG. 1 shows an embodiment of a method for adapting the measurement suite configuration of a gas turbine engine to provide robust performance tracking in light of sensor failures or data dropouts. The method begins with acquiring engine gas path data samples at discrete times k (step 102). The gas path data comprises a plurality of gas path parameter measurements such as spool speeds, temperatures, pressures and flow rates. For a particular gas turbine engine model and its particular application, there may be a default set of parameters measured in the engine's gas path. This conforms to a standard "bill-of-material" sensor configuration for that engine model and application.

The default set of parameters creates a measurement suite and is known a priori (step 103). A measurement matrix $M_C$ is assembled based on the default set of engine measurement parameters and is maintained. The measurement matrix $M_C$ is an identity matrix of size m (m×m) where m is the number of measured parameters and is defined by $$M_C(i, j) + \begin{cases} 1 & i = j \\ 0 & i \neq j \end{cases}, \quad (1)$$

where i and j are row and column indices.

The vector of engine gas path parameters at a time k are typically compared to predefined thresholds in order to determine the quality and/or availability of the measurement parameters (step 104). An out-of-range parameter, or a missing parameter, would fail these tests and the vector of measurement parameters Z would be flagged as not having the default configuration. Likewise, if all of the parameters were within threshold, then the vector of measurement parameters would be flagged as having the default configuration and would immediately be available for performance diagnostic tracking (step 109).

If the vector of measurement parameters Z was flagged as not having the default configuration indicating that at least one measurement parameter was either outside of the predefined threshold or was missing altogether, i.e. a data dropout. In either case, the questionable, or missing parameter measurement is determined not present for subsequent performance diagnostic tracking (step 105) and the measurement configuration matrix $M_C$ is altered (step 106)

$$M_C(i, j) = \begin{cases} 0 & i \neq j \\ 1 & i = j \quad i^{th} \text{ measured parameter is present} \\ 0 & i = j \quad i^{th} \text{ measured parameter is NOT present} \end{cases} \quad (2)$$

By way of background, engine performance diagnostic tracking typically estimates sensor performance as well as engine module performance. For the engine modules, the performance parameters usually take the form of changes, or performance deltas (from a nominal or installed state) in module efficiency and flow parameters. For the sensors themselves, a sensor error parameter x is part of the gas path analysis and is estimated and tracked.

Performance deltas are calculated from a reference (nominal). If all of the parameter deltas are close to zero and one parameter has a large delta value, it may indicate a "sensor" error. Sensor error is not limited to the instrument, but may include an error in the data recording, data reduction, normalization, etc.

The sensor error is a measure of the accuracy of the sensor and is included in the performance estimation process to absorb the effects of sensor bias and drift and to a lesser degree, sensor nonrepeatability. Performance estimation helps in preventing corruption of the module performance estimates from sensor errors. Therefore, if a measurement parameter x is not present, any subsequent analysis should effectively drop the associated sensor error estimate from the performance estimation process. This process is controlled by a fault configuration matrix $F_C$ which is assembled and tracks the measurement configuration matrix $M_C$.

When the measurement configuration matrix $M_C$ is based on a default engine configuration, the fault configuration matrix $F_C$ is also an identity matrix. If $M_C$ is altered, $F_C$ will also be altered. A set of rules may be developed to control how $F_C$ is changed as a function of the change in $M_C$, and may vary from application to application. A fault configuration matrix $F_C$ is assembled based on the default set of fault parameters and is maintained. The fault configuration matrix $F_C$ is an identity matrix of size n (n×n) where n is the number of performance faults being estimated x by the subsequent performance diagnostic tracking process and n>m. The fault configuration matrix $F_C$ is defined by $$F_C(i, j) = \begin{cases} 1 & i = j \\ 0 & i \neq j \end{cases}. \quad (3)$$

The fault configuration matrix $F_C$ includes the module estimated performance faults x (efficiency and flow parameter changes) as well as sensor faults and any other engine system fault that may be included in the performance diagnostic tracking process. The list of potential faults (n) to estimate for the default measurement configuration is predefined and specified by the analyst performing the diagnostic tracking.

If the measurement configuration matrix $M_C$ has been updated (step 106) from the last time sample k−1, the fault configuration matrix $F_C$ is similarly updated (step 107). The fault configuration matrix $F_C$ is altered to exclude those faults whose estimation is affected by the loss of a corresponding measurement parameter(s) that is used to calculate the performance estimate (performed in step 106).

For example, if the pressure measurement sensor coupled to the inlet of the High Pressure Compressor (HPC) (referred to as P25) failed, or if its output signal suffered a dropout, the measurement configuration matrix $M_C$ is adjusted to reflect this. If the $q^{th}$ measured parameter is P25, $M_C(q,q)$ would be set to 0. The fault configuration matrix $F_C$ is similarly updated, $F_C(p,p)=0$, where the $p^{th}$ parameter in the fault set represents the P25 sensor fault. In general, $F_C$ is updated by $$F_C(i,j) = \begin{cases} 0 & i \neq j \\ 1 & i = j \quad i^{th} \text{ performance is Fault present} \\ 0 & i = j \quad i^{th} \text{ performance Fault is NOT present} \end{cases} \quad (4)$$

In the performance tracking calculations that follow (step 108), the measurement configuration matrix $M_C$ and fault configuration matrix $F_C$ effectively removes the P25 measurement from the performance fault calculations and the P25 sensor error estimate from the active fault list by adaptation. Performance calculations are typically performed using a least squares, or generalized least squares estimation calculation. The Kalman filter is one approach that is used and is a generalized least squares approach that is used to teach the method.

Performance tracking estimates are changes in various performance parameters such as efficiencies, flow capacities, sensor faults, etc., from perceived changes in the measured gas path parameters. The changes, or performance deltas, in the measured gas path parameters are calculated as percent changes from a reference that is typically the nominal engine values expected for the given flight and power condition. The percent deltas are calculated for each measured parameter m and stored as m×1 vectors of percent deltas Z. The percent delta changes in the performance parameters n are computed as an n×1 vector $\hat{x}$ as $$\hat{x} = x_0 + D(Z - Hx_0), \quad (5)$$

where $x_0$ is an n×1 vector of a priori estimations for the performance changes, D is an n×m Kalman gain matrix, and H is an m×n set of influence coefficients in percent which represents the physics model for how measurement parameters change for 1% changes in the performance parameters. H represents a linear approximation model of the interrelationships between the performance parameter deltas x and the measured gas path parameter deltas Z.

The influence coefficient matrix H is typically partitioned into two submatrix sections, an engine performance fault submatrix $H_e$ and a sensor performance fault submatrix $H_s$, $H_e$ is an m×$n_e$ submatrix and $H_s$ is an m×$n_s$ submatrix where $n_e$ represents the number of engine performance faults being tracked and $n_s$ is the number of measurement sensor faults being tracked where $n_e \neq n_s$ and $n_s \geq m$. The total number of performance faults is $n = n_e + n_s$ and H is the concatenation of the two submatrices, i.e. $H=[H_e:H_s]$. This linear model takes the form $$Z = Hx + \theta, \quad (6)$$

where $\theta$ is an m×1 vector of random noise representing measurement nonrepeatability. (5) provides a means of calculating an estimate $\hat{x}$ for the true (and unknown) vector of performance changes x. The Kalman gain matrix D is defined as $$D = P_0 H^T (H P_0 H^T + R)^{-1}, \quad (7)$$

where R represents an m×m measurement covariance matrix and $P_0$ represents an n×n state covariance matrix. In the above equations, a −1 superscript indicates matrix inversion and a T superscript indicates matrix transposition.

The measurement covariance matrix R is calculated from knowledge of the known measurement sensor nonrepeatability standard deviations $\sigma_i$, i=1, 2, . . . , $n_s$ and the sensor performance fault influence coefficient submatrix $H_s$ as $$R = H_s \text{diag}(S) H_s^T, \quad (8)$$

where S is an $n_s \times 1$ vector of the $\sigma_i$, =1, 2, . . . , $n_s$ values and diag(S) is an $n_s \times n_s$ diagonal matrix with S entries on the main diagonal and entries outside of the main diagonal are all zero. (5), (6), (7) and (8) represent Kalman filter equations.

Once the measurement configuration $M_C$ and fault configuration $F_C$ matrices have been updated (steps 106, 107), they may be used to adapt the performance estimation process described above to fit the measurement configuration of the current data point being processed (step 109) as follows.

The measurement configuration $M_C$ and fault configuration $F_C$ matrices adapt the influence coefficient matrix H, creating a modified influence coefficient matrix $\tilde{H}$ $$\tilde{H} = M_C H F_C \quad (9)$$

The measurement configuration $M_C$ in conjunction with the modified influence coefficient matrix $\tilde{H}$ adapt the measurement sensor nonrepeatability standard deviations S, creating a modified measurement covariance matrix $\tilde{R}$ $$\tilde{R} = \tilde{H}_s \text{diag}(S) \tilde{H}_s^T + (I - M_C), \quad (10)$$

where I is an m×m identity matrix.

The modified influence coefficient matrix $\tilde{H}$ and modified measurement covariance matrix $\tilde{R}$ adapt the Kalman gain matrix $\tilde{D}$ $$\tilde{D} = P_0 \tilde{H}^T (\tilde{H} P_0 \tilde{H}^T + \tilde{R})^{-1}. \quad (11)$$

The performance delta $\hat{x}$ is calculated using the modified values and is output $$\hat{x} = x_0 + \tilde{D}(Z - \tilde{H} x_0). \quad (12)$$

The performance changes for $\hat{x}(i)$ where $F_C(i,i)=1$, and i=1, 2, . . . , n, may be reported to the end-user for performance tracking purposes.

Figure 2:
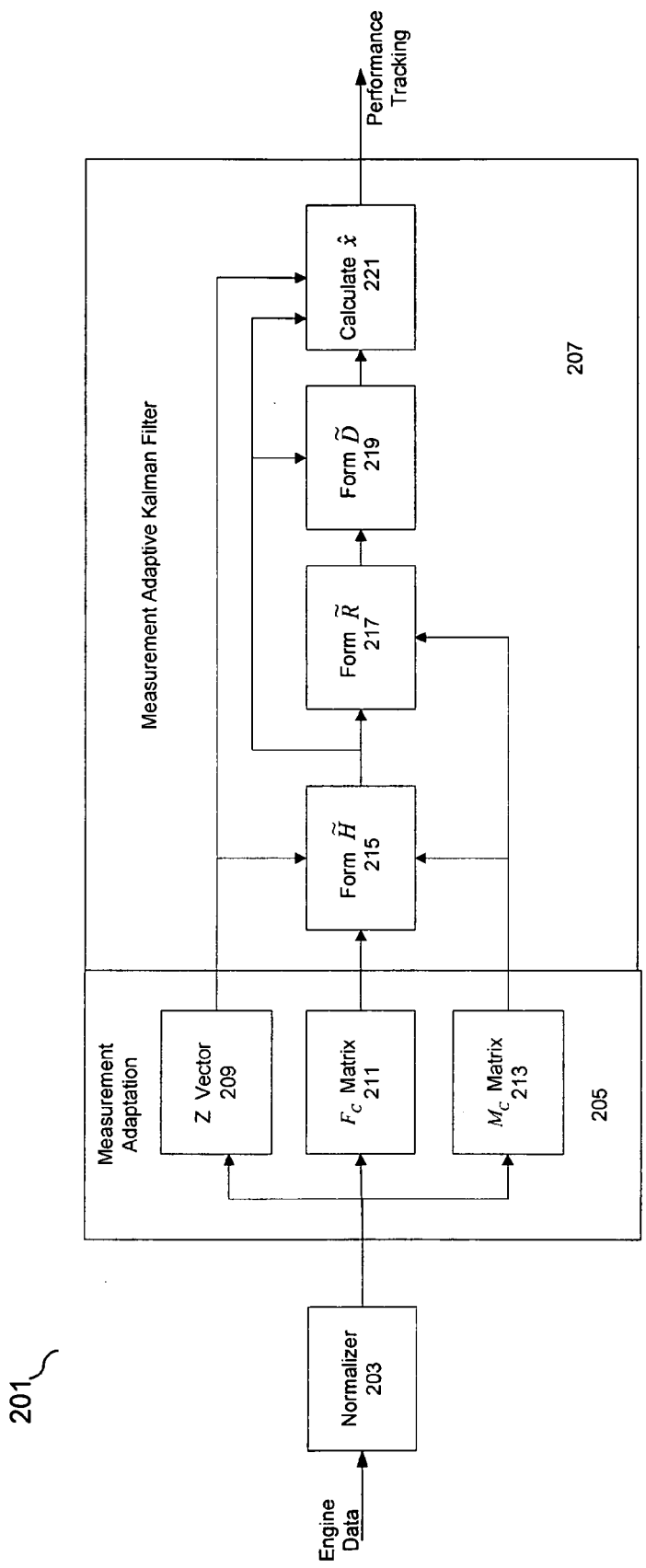
FIG. 2 is an exemplary application framework of the individual modules of the invention.

Shown in FIG. 2 is a framework 201 embodiment of the various modules that comprise and implement the invention. The framework 201 receives data from the monitoring sensors located on the gas turbine engine.

The framework 201 comprises a data normalizer 203 coupled to a measurement adaptation module 205, which is coupled to an adaptive Kalman filter 207 for estimating gas turbine engine module performance changes. The data normalizer 203 compares acquired engine measurement data against an engine model to derive the engine performance measurement deltas. The measurement adaptation module 205 comprises a Z vector assembler 209, an $F_C$ matrix assembler 211 and an $M_C$ matrix assembler 213. The measurement deltas are assembled into a vector Z 209 and appropriate changes are made to the $M_C$ matrix 213, as previously described. The $F_C$ matrix assembler 211 modifies the performance faults that will be estimated from the current configuration of measurement deltas. The adaptive Kalman filter 207 comprises an adaptive influence $\tilde{H}$ matrix engine 215, an adaptive measurement covariance $\tilde{R}$ matrix engine 217, an adaptive Kalman gain $\tilde{D}$ matrix engine 219 and an adaptive state estimation $\hat{x}$ engine 221. The measurement configuration $M_C$ 213 and fault configuration $F_C$ 211 matrices adapt the Kalman filter 207 to a given measurement suite. This process is performed at every time step k for which data is available for processing.

The effect of updating the Kalman filter estimation equations as outlined above for a specific measurement configuration $M_C$ and associated fault configuration $F_C$ is to produce identically what would be tracked for performance changes given that measurement configuration suite from the onset. Since this process may be implemented in software or hardware, either on-board or off-board, the advantage in employing the invention is that there is no need for dynamic reallocation of memory to accommodate the changes in matrix sizes dictated by different measurement configurations. In the process described above, the matrix dimensions are fixed to the default measurement size m and performance fault size n and do not change.

The use of the configuration matrices $M_C$ and $F_C$ zero-out the appropriate rows and columns in the associated Kalman filter estimation process such that the remaining non-zero portions provide the same results one would obtain using the lower dimensional quantities dictated by the measurement suite. In the previous example cited where the P25 pressure measurement drops out, the measurement delta vector has essentially been reduced in size by one, to an (m−1)×1 vector. This reduction in dimensionality would normally require associated reductions in the model numerical elements, i.e. H, R, and D. The use of the $M_C$ and $F_C$ configuration matrices allow the original dimensions to be maintained. This supports an autonomous process that may reconfigure itself in accordance to the present measurement configuration without need for software changes or manual intervention.

One or more embodiments of the present invention have been described. Nevertheless, it will be understood that various modifications may be made without departing from the spirit and scope of the invention. Accordingly, other embodiments are within the scope of the following claims.

What is claimed is:

1. A method for adapting measurements from a gas turbine engine for use in performance tracking comprising:
   selecting a default engine configuration for the gas turbine engine and its application;
   acquiring gas path data samples corresponding to a predetermined number of measured parameters;
   deriving performance parameters for the gas turbine engine;
   comparing the measured parameters and performance parameters at time k with predefined thresholds to determine the quality and/or availability of each parameter, wherein parameters determined to be questionable are defined as not present for performance tracking;
   determining a measurement configuration matrix $M_C$ based on the default engine configuration and present measured parameters Z, and a fault configuration matrix $F_C$ based on the default engine configuration and present performance parameters $x_0$; and
   adapting performance tracking methods using the measurement configuration matrix $M_C$ and fault configuration matrix $F_C$.

2. The method according to claim 1 wherein the measurement configuration matrix $M_C$ is an identity matrix of size m where m=number of measured parameters.

3. The method according to claim 2 wherein the fault configuration matrix $F_C$ is an identity matrix of size n where n=the number of performance faults being estimated.

4. The method according to claim 3 further comprising performing performance tracking calculations using a least squares or generalized least squares estimation calculation.

5. The method according to claim 4 wherein the least squares estimation is a Kalman filter.

6. The method according to claim 5 wherein the Kalman filter is an adaptive Kalman filter.

7. The method according to claim 6 wherein a zero entry in the measurement configuration matrix $M_C$ main diagonal represents a questionable or missing parameter measurement.

8. The method according to claim 7 wherein a zero entry in the fault configuration matrix $F_C$ main diagonal represents those faults whose estimation is affected by the loss of a corresponding measurement parameter(s) that is used to calculate the performance estimate.

9. The method according to claim 8 further comprising adapting an influence coefficient matrix H using the measurement configuration $M_C$ and fault configuration $F_C$ matrices, creating a modified influence coefficient matrix Ĥ.

10. The method according to claim 9 further comprising adapting a measurement sensor nonrepeatability standard deviation S using the measurement configuration $M_C$ matrix and adapted influence coefficient matrix Ĥ, creating a modified measurement covariance matrix R̂.

11. The method according to claim 10 further comprising adapting a Kalman gain matrix D̂ using the modified influence coefficient matrix Ĥ and modified measurement covariance matrix R̂.

12. The method according to claim 11 further comprising calculating a performance delta x̂ using the adapted Kalman gain matrix D̂, the adapted influence coefficient matrix Ĥ, present measured parameters Z, and present performance parameters $x_0$.

13. A system for adapting measurements from a gas turbine engine for use in performance tracking comprising:
   means for selecting a default engine configuration for the gas turbine engine and its application;
   means for acquiring gas path data samples corresponding to a predetermined number of measured parameters;
   means for deriving performance parameters for the gas turbine engine;
   means for comparing the measured parameters and performance parameters at time k with predefined thresholds to determine the quality and/or availability of each parameter, wherein parameters determined to be questionable are defined as not present for performance tracking;
   means for determining a measurement configuration matrix $M_C$ based on the default engine configuration and present measured parameters Z, and a fault configuration matrix $F_C$ based on the default engine configuration and present performance parameters x; and
   means for adapting performance tracking methods using the measurement configuration matrix $M_C$ and fault configuration matrix $F_C$.

14. The system according to claim 13 wherein the measurement configuration matrix $M_C$ is an identity matrix of size m where m=number of measured parameters.

15. The system according to claim 14 wherein the fault configuration matrix $F_C$ is an identity matrix of size n where n=the number of performance faults being estimated.

16. The system according to claim 15 further comprising means for performing performance tracking calculations using a least squares or generalized least squares estimation calculation.

17. The system according to claim 16 wherein the least squares estimation is a Kalman filter.

18. The system according to claim 17 wherein the Kalman filter is an adaptive Kalman filter.

19. The system according to claim 18 wherein a zero entry in the measurement configuration matrix $M_C$ main diagonal represents a questionable or missing parameter measurement.

20. The system according to claim 19 wherein a zero entry in the fault configuration matrix $F_C$ main diagonal represents those faults whose estimation is affected by the loss of a corresponding measurement parameter(s) that is used to calculate the performance estimate.

21. The system according to claim 20 further comprising means for adapting an influence coefficient matrix H using the measurement configuration $M_C$ and fault configuration $F_C$ matrices, creating a modified influence coefficient matrix Ĥ.

22. The system according to claim 21 further comprising means for adapting a measurement sensor nonrepeatability standard deviation S using the measurement configuration $M_C$ matrix and adapted influence coefficient matrix Ĥ, creating a modified measurement covariance matrix R̂.

23. The system according to claim 22 further comprising means for adapting a Kalman gain matrix Đ using the modified influence coefficient matrix Ĥ and modified measurement covariance matrix R̂.

24. The system according to claim 23 further comprising means for calculating a performance delta x̂ using the adapted Kalman gain matrix Đ, the adapted influence coefficient matrix Ĥ, present measured parameters Z, and present performance parameters $x_0$.

* * * * *

UNITED STATES PATENT AND TRADEMARK OFFICE
CERTIFICATE OF CORRECTION

PATENT NO. : 7,441,448 B2
APPLICATION NO. : 11/657323
DATED : October 28, 2008
INVENTOR(S) : Allan J. Volponi It is certified that error appears in the above-identified patent and that said Letters Patent is hereby corrected as shown below:

In column 3, lines 46-48, " $M_C(i,j) + \begin{cases} 1 & i = j \\ 0 & i \neq j \end{cases}$ ", should read -- $M_C(i,j) = \begin{cases} 1 & i = j \\ 0 & i \neq j \end{cases}$ --.

In column 5, line 55, " $H = [H_e : H_s]$ ", should read -- $H = [H_e \vdots H_s]$ --.

In column 6, line 9, "$\sigma_i, = 1, 2,\ldots, n_s$", should read -- $\sigma_i, i = 1, 2,\ldots, n_s$ --.

In column 6, line 20, " $H$ ", should read -- $\tilde{H}$ --.

In column 6, line 21, " $H = M_C \ H \ F_C$ ", should read -- $\tilde{H} = M_C \ H \ F_C$ --.

In column 6, line 24, " $H$ ", should read -- $\tilde{H}$ --.

In column 6, line 26, " $R$ ", should read -- $\tilde{R}$ --.

In column 6, line 30, " $H$ ", should read -- $\tilde{H}$ --.

In column 6, line 31, " $R$ ", should read -- $\tilde{R}$ --.

In column 6, line 32, " $D$ ", should read -- $\tilde{D}$ --.

In column 6, line 60, " $H$ ", should read -- $\tilde{H}$ --.

In column 6, line 61, " $R$ ", should read -- $\tilde{R}$ --.

In column 6, line 62, " $D$ ", should read -- $\tilde{D}$ --.

In column 8, claim 9, line 14, " $H$ ", should read -- $\tilde{H}$ --.

In column 8, claim 10, line 18, " $H$ ", should read -- $\tilde{H}$ --.

In column 8, claim 10, line 19, " $R$ ", should read -- $\tilde{R}$ --.

In column 8, claim 11, line 21, " $D$ ", should read -- $\tilde{D}$ --.

UNITED STATES PATENT AND TRADEMARK OFFICE
CERTIFICATE OF CORRECTION

PATENT NO. : 7,441,448 B2
APPLICATION NO. : 11/657323
DATED : October 28, 2008
INVENTOR(S) : Allan J. Volponi It is certified that error appears in the above-identified patent and that said Letters Patent is hereby corrected as shown below:

In column 8, claim 11, line 22, " $H$ ", should read -- $\tilde{H}$ --.

In column 8, claim 11, line 23, " $R$ ", should read -- $\tilde{R}$ --.

In column 8, claim 12, line 26, " $D$ ", should read -- $\tilde{D}$ --.

In column 8, claim 12, line 26, " $H$ ", should read -- $\tilde{H}$ --.

In column 9, claim 21, line 9, " $H$ ", should read -- $\tilde{H}$ --.

In column 10, claim 22, line 1, " $H$ ", should read -- $\tilde{H}$ --.

In column 10, claim 22, line 2, " $R$ ", should read -- $\tilde{R}$ --.

In column 10, claim 23, line 4, " $D$ ", should read -- $\tilde{D}$ --.

In column 10, claim 23, line 5, " $H$ ", should read -- $\tilde{H}$ --.

In column 10, claim 23, line 6, " $R$ ", should read -- $\tilde{R}$ --.

In column 10, claim 24, line 9, " $D$ ", should read -- $\tilde{D}$ --.

In column 10, claim 24, line 10, " $H$ ", should read -- $\tilde{H}$ --.

Signed and Sealed this

Second Day of June, 2009

JOHN DOLL
*Acting Director of the United States Patent and Trademark Office*